April 24, 1962     R. F. SNYDER     3,031,560
ELECTRICAL TEMPERATURE CONTROL APPARATUS Filed March 31, 1958     3 Sheets-Sheet 1

*INVENTOR.*
ROBERT F. SNYDER
BY
*R.L. Miller*
ATTORNEY

INVENTOR.
ROBERT F. SNYDER
BY
*R. L. Miller*
ATTORNEY

United States Patent Office 3,031,560
Patented Apr. 24, 1962

3,031,560
ELECTRICAL TEMPERATURE CONTROL APPARATUS
Robert F. Snyder, Lakemore, Ohio, assignor to The Goodyear Tire & Rubber Company, Akron, Ohio, a corporation of Ohio
Filed Mar. 31, 1958, Ser. No. 725,262
14 Claims. (Cl. 219—20)

This invention relates to electrical heating and control units and particularly to electrical heating and control units for use with tire vulcanization equipment.

The accurate control of the temperature generated in an electrical resistance heating element has long presented challenging problems. This is particularly true where electrical heating is desired in fields such as tire vulcanization and retreading. While many problems must be faced, one of the more important is the provision of a control unit which can accurately sense and control the temperature in the system and yet withstand severe service conditions. In addition, the control should ideally be extremely stable electrically and remain substantially unaffected by transient variations in the system it seeks to control. Control systems used in the past have failed to satisfy these requirements in a simple and dependable manner. As will become apparent, the present invention successfully solves these problems and at the same time provides a flexible but highly stable control for an electrical heating system. It will become obvious from the description which follows that the electrical controls described may be easily adapted to regulate electrical heating systems in a wide variety of applications. However, since the present invention is particularly useful in the control of electrical heaters in a tire vulcanization unit, it will be described for purposes of illustration in that aspect.

The steps involved in a conventional tire retreading operation are well known and need not be repeated here. An ample description may be found in the application S.N. 665,795, filed June 14, 1957, entitled "Tire Retreading," now United States Patent 2,938,100, which deals with subject matter similar to the present invention. Suffice to say that the conventional methods, which utilize molds heated about only the outer periphery, were slow, difficult to control to assure an effective cure without over or under cure of a portion of the tire, and subject to errors by the operator. This is particularly true of retreading operations for large truck and off-the-road tires which often require many hours to complete a cure and where accurate control of the curing temperature for long periods is essential.

It is a primary object of the present invention to provide a method and apparatus for rapidly and efficiently effecting the vulcanization of new tread to a tire carcass.

It is a further object of the present invention to provide a highly stable and rugged automatic control system for electrical heating systems.

It is an additional object of the present invention to provide method and apparatus to control electrical heating systems which posses self protective features to avoid damage due to malfunctioning of the heaters.

It is still a further object of the present invention to provide a tire retreading system which can accommodate tires of a wide variety of sizes.

These and other objects will become apparent from the following description and drawings in which.

As mentioned previously, conventional retreading operations are, in general, very time consuming and exacting. One of the reasons why retreading tires, particularly large tires, is expensive is that a lower vulcanization temperature for a longer time must be used where heat is applied only from the tire exterior. This has been necessary heretofore because the use of high temperature to shorten the total cure time will result either in an under cure of the tread interior or an over cure of tread surface due to the problem of heat transfer through the thick tread stock. Thus, costly equipment is tied up for long periods with resulting low productivity and the risk of inferior results. The provision of a method and apparatus for retreading which materially shortens the total cure time and simultaneously assures an even cure is obviously to the great advantage of the retread shop. The patent application referred to previously, discloses a system for retreading smaller size tires which utilizes electrical heating elements adjacent the inner surface of the tire to be retreaded and which, acting in conjunction with a steam heated outer mold, shortens the time required to vulcanize a retread on a passenger or moderate sized truck tire by a factor of approximately one-half. The savings thus effected are obvious. However, such a system is not able to accommodate very large tires due to the problem of maintaining temperature over a much wider area of tire. This requires either very high power with the consequent danger of electrical failure or a completely different second system of control. Furthermore, since the temperature generated by the electrical elements may vary over a substantial range due to operator error and transient variation in the power source, systems of the type disclosed have the disadvantage of inaccurate heat control since they are not able to correct for such occurrences. In addition, many systems proposed in the past utilize electronic components particularly electron tubes which exhibit electrical instability and relatively short operational life under the conditions necessarily found in high temperature retread molds. The present invention avoids these difficulties and, moreover, may be used in curing small tires as well as easily adapted to cure large tires with a comparable reduction in total cure time. This is accomplished through the use of a highly reliable and effective main control unit with an easily integrated auxiliary unit for use in curing large tires.

Figure 1:
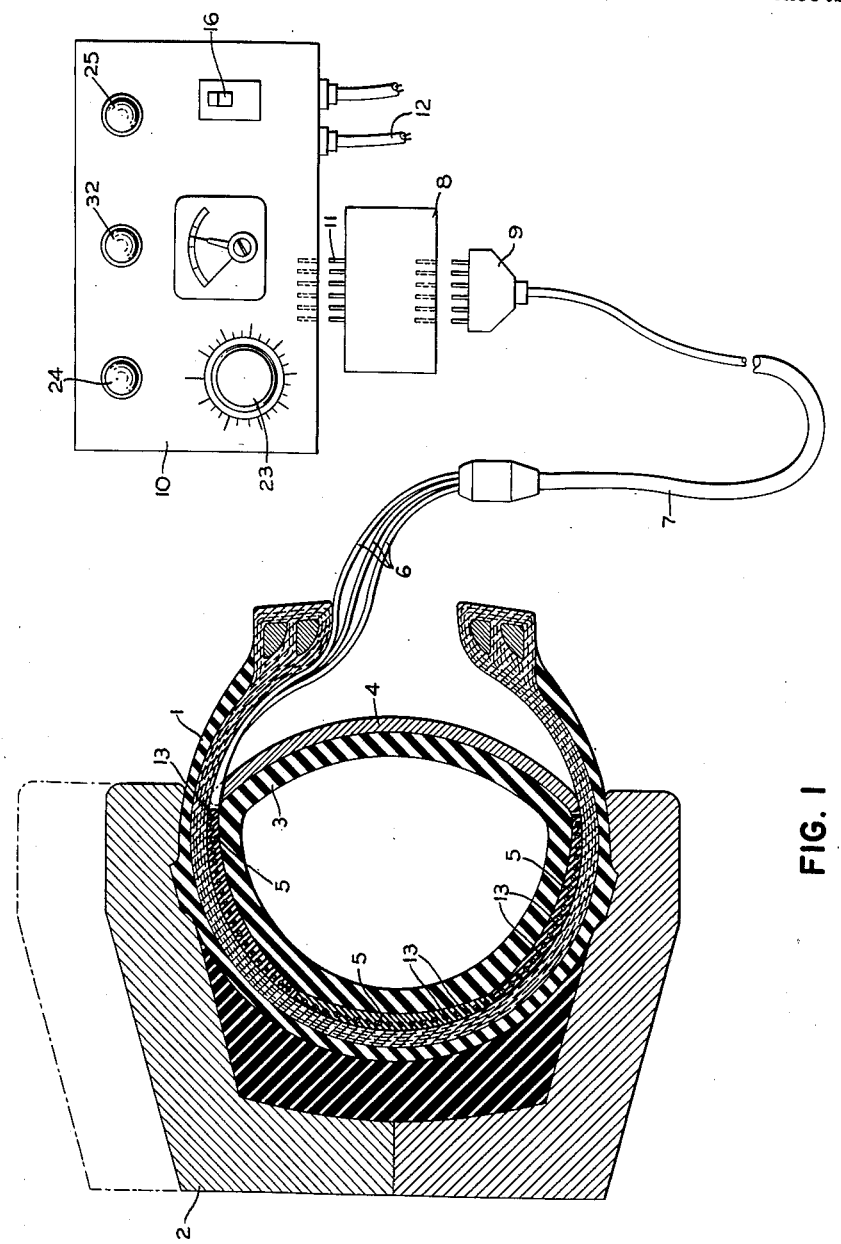
FIG. 1 illustrates a complete vulcanization system adapted to cure retreads on large tires.

Referring to FIG. 1, which illustrates a complete vulcanization system for a large tire, a tire 1 is shown in a conventional cap mold 2 having a conventional steam chamber about the mold exterior. The tire has a curing bag 3 inside and a rim or bull ring 4 which retains the tube 3 in the tire. The tire 1 is of the large off-the-road type and, according to the present invention, may be cured by the dual heating system illustrated which comprises the combination of steam heat to the tire exterior and electrical heat to the tire interior. The latter is supplied by a plurality of annular heating pads or bands 5 shown between the curing bag 3 and the inner periphery of the tire 1. Although the bands 5 are shown as individual physical units, a single large band having a plurality of electrically separate units embedded therein may be used. Where desired, the spacing of the conductors in the heaters may be varied in order to secure optimum effective heat distribution for retreading tires of non-uniform tread thickness. Power lines 6 lead from the bands 5 to a main cable 7 which is connected into auxiliary control box 8 by a conventional connector 9. Box 8 is in turn connected through a second conventional plug 11 to the main control box 10. A mains power cord 12 is used to connect the control circuit in box 10 to a commercial power source (not shown). Although in many molds steam heat is used to supply heat to the exterior surface of the tire, it is obvious that electrical elements similar to the bands 5 could be substituted therefor. In instances where it is desired to vulcanize a passenger tire, only one heating band is necessary and the auxiliary box 8 may be dispensed with as will become clear from a description of the electrical control circuits.

The heating bands or pads 5 are flexible annular elements having resistance heating wires 13 embedded therein. The wires increase in resistance as the temperature changes and this phenomenon is taken advantage of in the control of the vulcanization temperature. A description of typical bands and the resistance characteristics of the heating elements may be found in the application entitled "Electric Heating Element and Method and Apparatus for Producing It," S.N. 640,387, filed February 15, 1957, now Patent No. 2,929,909 and will not be repeated here since the construction of the bands forms no part of the present invention.

After the tire has been prepared, the operator need only set the total cure time by timer element on control box 10, open the steam line to mold 2, and close the main power switch in the box 10 in order to perform the vulcanization of the retread. As will be subsequently explained, the control circuit automatically supplies power to the bands 5 while periodically monitoring the temperature of each band to assure that a constant temperature is maintained so that the operator is free to perform other tasks. At the end of cure, the control shuts off the power to the heating elements and lights an indicator light 24 on box 10 to signal the cure is completed. The operator then need only shut off the steam and allow the mold to cool somewhat before removing the tire. It is obvious that with such a system even a relatively unskilled operator can handle a number of units simultaneously.

Since, with a dual heating system as used in the present invention, all retreading operations may be carried out at temperatures within a few degrees of a preselected temperature, for example 300° F., the control system needs no wide range adjustment as in conventional systems. Hence, the possibility of a large error in temperature selection is avoided. Narrow-range adjustment to permit minor changes in temperature to accommodate slightly different tread compounds is provided and may be easily set by the operator or technician as will later appear.

The control circuit of the present invention is also designed to avoid the problems arising from variations in the power source for the system. Since electrical resistance controlled systems rely on current through the load to indicate the temperature of the heating units, voltage variations in the power source, which cause a change in current to the load, appear to conventional controls to be temperature variations in the heating elements although this is not in fact the case. For this reason, conventional systems are often in error due to transient fluctuations in the power source. This is a particular problem in a retread shop where large loads are constantly and randomly being thrown into and out of the circuit. The control circuit of the present invention automatically compensates for these fluctuations in a manner which will become clear from the description which follows.

Figure 2:
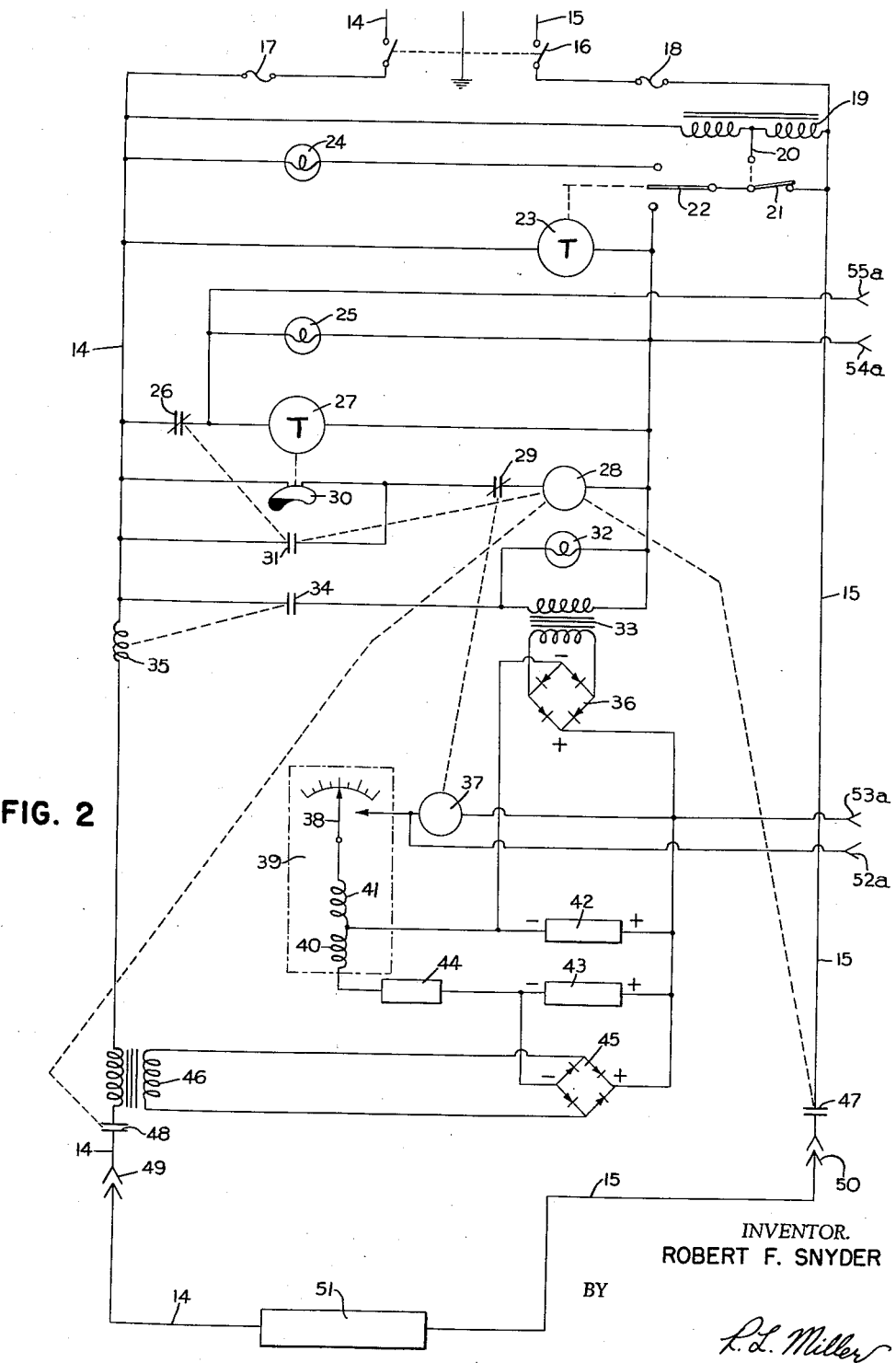
FIG. 2 is a schematic of the main electrical control system.

FIG. 2 illustrates the main control circuit which is used with a single heating band in the cure of passenger size and small truck tires. Dotted lines are used to indicate mechanical connection between relay coils and contacts to facilitate tracing the circuit action. While the seqential operation of the circuit will be subsequently explained, the following description of the circuit will aid in an understanding of the system. The mains power leads, designated by numerals 14 and 15, are designed to carry 110 volt 60 cycle A.C. for passenger tire cures and 220 volt 60 cycle A.C. for truck and larger tires. The lines 14 and 15 have a double pole main power switch 16 and fuses 17 and 18 in series therewith. An auto-transformer 19 is connected across the power lines 14 and 15 and carries a center tap connection 20 with a jumper switch 21 connectable thereto. In the position shown in FIG. 2, the switch 21 supplies 110 v. A.C. to the control circuit. When 220 v. A.C. is to be used, the switch is moved to contact connection 20 to tap 110 v. A.C. for the control portion of the circuit. An off-on switch 22 is connected to switch 21 and is controlled by timer 23 by which the total cure time is set. If desired, the timer system may be by-passed by adding a line switch and manual timing used. "Finish" light 24 is connected across the lines 14 and 15 through switch 21 and the second pole of switch 22. A "power-on" indicator light 25 is connected across the 110 volt control circuit supply through the normally closed contacts 26 of relay 28. A cycling timer 27 is connected in parallel with light 25 from one side of power to the line between the light 25 and the normally closed contacts 26. Relay 28 is connected on one side directly to the power and through the normally closed contacts 29 of relay 37 and a mercury switch 30 to power lead 14. A pair of normally open contacts 31 of relay 28 are connected from the line 14 in parallel with the mercury switch 30 and to the conductor between the switch 30 and contacts 29. A normally open contact 34 of series relay coil 35 is connected between the control circuit lines through the primary of potential transformer 33. A "heat-on" indicator light 32 is connected from one control circuit power line in parallel with the primary of transformer 33 to the conductor between the transformer and the contacts 34. The secondary of transformer 33 feeds a rectifying bridge 36. The transformer 33 may be selected to produce any desired voltage in its secondary. However, for the present application it is a 110:13 step-down transformer.

Power line 14 has the relay coil 35 in series as well as the primary of current transformer 46, and the normally open contacts 48 of relay 28. The line 14 is connected to the heating element or load 51 through the connector 49. The other power line 15 is directly connected to load 51 from one end of auto transformer 19 through normally open contacts 47 of relay 28 and through the connector 50.

The secondary of current transformer 46 feeds a rectifying bridge 45. The output of bridge 36 previously mentioned is connected across its load resistor 42 and the output of bridge 45 is connected across its load resistor 43 in polar opposition to the signal from bridge 36. Since bridge 36 produces a potential in fixed proportion to the voltage of the power source and current transformer 46 produces a voltage in proportion to the current in the load, the bucking of these two voltages produces a difference signal free of signal variations due to fluctuations in the power source. Since such fluctuations would ordinarily appear to the control like a change in resistance of the load with temperature variation, their elimination assures a very accurate control of the actual temperature at the load.

The output of bridge 45 is impressed on the primary coil 40 of meter relay 39 through the dropping resistor 44. The signal from bridge 36 is also presented to the coil 40 of meter relay 39 but in polar opposition to that from bridge 45. Thus, the meter relay is rendered sensitive to the difference signal of the bridges. A booster coil 41 of the meter relay 39 insures that the contact 38 remains closed once it makes its circuit due to the signal through coil 40. The other side of contact 38 is connected to relay 37 and thence to one output side of the bridges 36 and 45.

A brief description of one complete cure cycle for a passenger car will clarify the operation of the control system.

Having placed the prepared tire with its retread rubber in a mold and inflated the curing tube within the tire, the operator then actuates the mechanism to supply heat to the tire. If the mold is a conventional one, this may require that the operator turn steam into the mold as well as energize the electrical elements. Of course, the mold can be heated entirely by electricity by placing heating elements in the mold jacket adjacent the exterior periphery of the tire. The temperature to be produced is, in general, fixed by selection of the circuit elements at about 300° F. However, this may be changed over a range of approximately 25° by moving the meter relay contact 38 up or down scale as desired. To start the electrical heating, the operator sets the timer 23 to the desired over-all cure time and closes the power switch 16 in lines 14 and 15. The jumper switch 21 is preset internally and need not be altered. Setting the timer 23 and closing the switch 22 energizes timer 23 and starts it running. This also sends power to the power-on indicator 25 through the normally closed contacts 26 and to the timer 27. After thirty seconds timer 27 momentarily closes the mercury switch 30 which energizes relay 28 through the normally closed contacts 29. Relay 28 locks itself into the line by closing normally open contacts 31 which shunts the mercury switch 30 so that when the switch 30 opens after approximately two seconds it has no effect on relay 28. Relay 28 also closes its normally open contacts 47 and 48 which connects the heating band 51 to the power source. Simultaneously relay 28 opens its normally closed contacts 26 in series with power on indicator 25 and timer 27 which drops them out of the line, extinguishing the power-on light 25 and stopping the timer 27 during the heating cycle. This avoids unnecessary wear on the timer while it is not needed. In addition, the operator is signaled that the control is working and the heater in operation when light 25 goes out and light 32 comes on.

Assuming that the heating band 51 is below the desired curing temperature its resistance will be low and, as will become clear, it will draw current from the power source which will energize relay coil 35 and the primary of current transformer 46. Coil 35 will actuate to close its normally open contacts 34 which lights the heat-on light 32 and connects the primary of potential transformer 33 across the power lines. At this point, power is to the load, the heat-on indicator is energized, and the primaries of both transformers are energized. The secondaries of transformers 33 and 46 supply an alternating current signal to the rectifying bridge 36 and 45 respectively, the former receiving a signal proportional to the line voltage and the latter a signal proportional to the current in the heating element. Since the heating element is composed of temperature responsive resistance elements which control the magnitude of the current in the line, the voltage in the rectifying bridge 45 is proportional to the temperature in the heating element. The bridges 36 and 45 rectify the signals received and present them in polar opposition to the main coil 40 of the meter relay 39 through the load resistors 42, and 43 and 44 respectively. The circuit constants of the heating element and control unit are selected, with due regard to the positive thermal resistance characteristics of the heating element 51, so that the signal from the current transformer 46 will over balance that from the potential transformer 33 until the heating element approaches to within a few degrees of the desired vulcanization temperature. Thus, the coil 40 is held negative at its lower end by the signal from rectifying bridge 45 which drives the meter pointer down scale, holding the contact 38 open. This condition continues until the heating band approaches the desired temperature at which point the signals across the meter coil balance out. The meter then zeroes. As the heating band increases in temperature, its resistance rises which drops the signal current in the primary of transformer 46. This causes a decrease in the signal from the secondary of transformer 46 which drops the signal from bridge 45 below that of bridge 36. The meter pointer then drives up scale until contact 38 is closed. The pointer is held closed due to the added effect of booster coil 41 which is brought into the line by the closing of contact 38. When contact 38 closes, the signal from the secondary of transformer 33 through the bridge 36 actuates relay 37. Relay 37 opens its normally closed contacts 29 which de-energizes relay 28. Relay 28 returns to its normal condition which disconnects the load 51 from the power source and reconnects the power-on indicator 25 and the timer 27. When the load is disconnected by the opening of contacts 47 and 48, the coil 35 is de-energized which opens the contacts 34 to extinguish the heat-on light 32 and remove voltage from the primary of transformer 33. Of course, with no current to the load, the primary of transformer 46 carries no current so that no signal reaches the relay meter from either transformer and contact 38 drops out. The entire control circuit is thus reset and when the timer 27 closes mercury switch 30 after the elapse of thirty seconds the entire cycle repeats to monitor the heating operation and retain the heating element at the selected temperature.

The foregoing description illustrates a typical normal operation. However, according to the invention, another feature assures that in the event of a malfunction in the heating element or the inadvertent operation of the system without a load attached, the circuit will be protected and warning will be given that the heating element is not operating correctly. Assuming either a break in the circuit in the heating pad 51 or the operation of the system without a heating element connected, the control would, but for the feature about to be described, attempt to operate normally. However, since no current would flow to the heating element because there is no circuit, no signal would be generated in the transformer 46. Hence, the meter relay would receive full voltage from the transformer 33. Under such conditions, the contact 38 would close violently and the meter would constantly be subjected to full voltage which might lead to severe damage thereto. However, in the present invention, the relay coil 35 is placed in series with the load and when no current flows due to a malfunction, the relay will fail to close its normally open contacts 34 and no power flows in the primary of transformer 33. This fail-safe feature prevents a signal from being generated in the secondary of transformer 33 and transmitted in full force to the meter relay. In addition, when the contacts 34 fail to close, the heat-on indicator is held out of the circuit and fails to light. Thus, if when the operator starts the system the power-on light extinguishes every thirty seconds but the heat-on indicator fails to light, the operator is warned that the system is malfunctioning. The control circuit is nonetheless protected during this abnormal condition by the fail-safe feature described.

Figure 3:
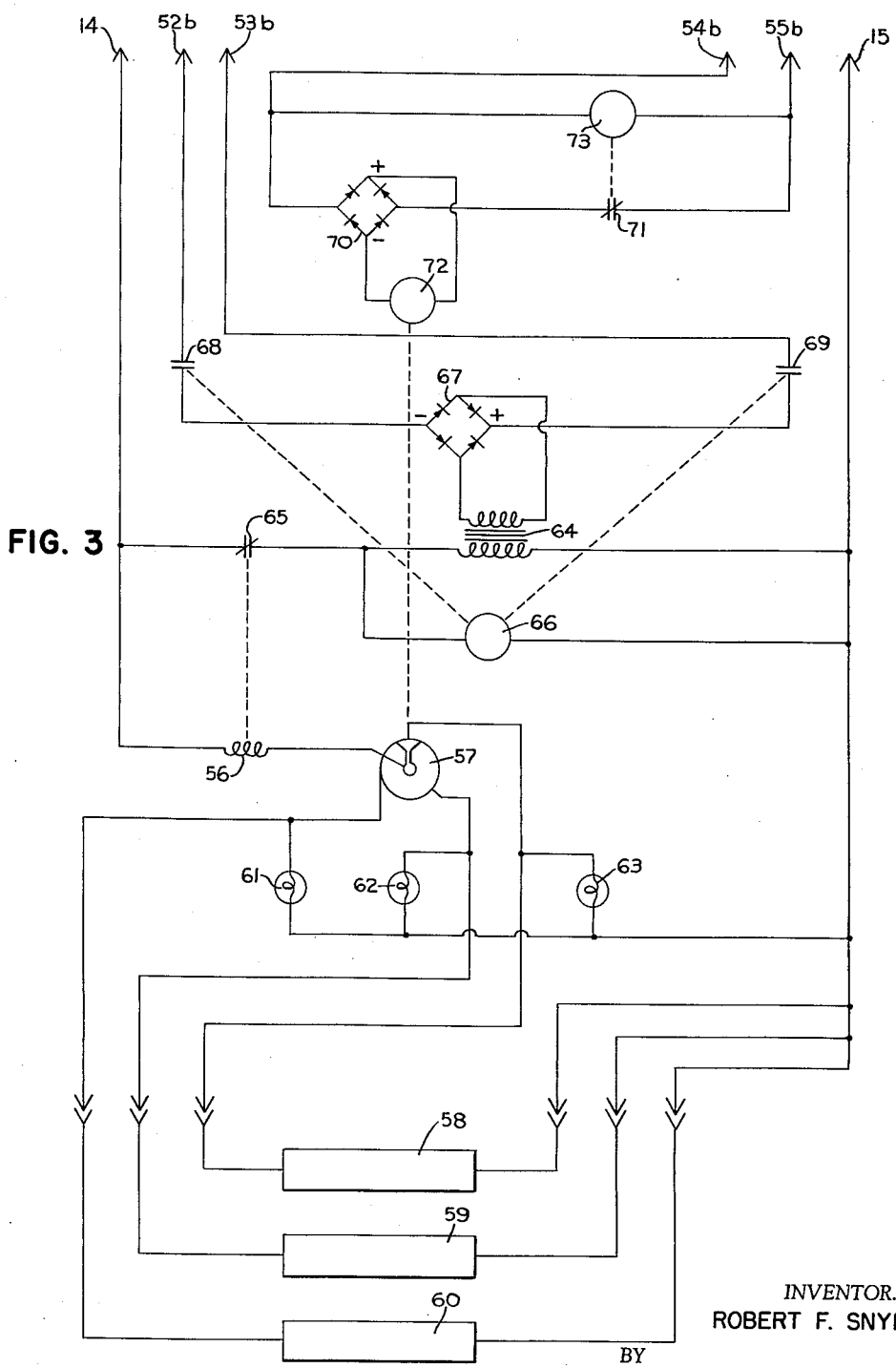
FIG. 3 is a schematic of an auxiliary electrical control circuit.

The control system of the present invention is designed to be easily adapted to cure large off-the-road tires such as earthmover and heavy truck tires. Such a system is illustrated in FIG. 1 and has been previously described. FIG. 3 is a schematic of the electrical control unit which permits the use of the circuit in FIG. 2 in the multiple heating band arrangement in FIG. 1.

Referring to FIG. 2, four auxiliary lines 52a, 53a, 54a, and 55a are provided to connect the auxiliary control circuit shown in FIG. 3 into the main control circuit in order to permit the curing of large off-the-road tires by means of a multiple heating element system such as illustrated in FIG. 1. The other two lines shown in FIG. 3 connect into the normal load lines 14 and 15 shown at the bottom of FIG. 2. The circuit illustrated in FIG. 3 is housed in the auxiliary control box 8 shown adjacent the main control box 10 in FIG. 1. The multiple heating element system in the mold then plugs into box 8 as shown.

The circuit of FIG. 3 is as follows: The load connecting line 15 connects directly to one end of the three heating elements 58, 59, and 60 illustrated. It will become obvious that a larger number of heating elements may be accommodated merely by changing a few components in the system. The load line 14 is connected in series with a relay coil 56 and to the stepping relay center contact 57. The three contacts of relay 57 have lines connecting them to the loads 58, 59, and 60. Lights 61, 62, and 63 are connected in parallel across these lines to the mains power and indicate which element is connected to power.

The primary of step-down potential transformer 64 is connected across the mains power through the normally closed contacts 65 of relay coil 56. A 5 second time delay relay 66 is connected in parallel with the primary of transformer 64. The secondary of the transformer 64 supplies a 12 volt signal to the rectifying bridge 67 which in turn sends a D.C. signal through the lines 52 and 53 to the main control unit. Lines 52 and 53 contain normally open contacts 68 and 69 which are actuated by the five second time delay relay 66. Conductors 54 and 55 connect a rectifying bridge 70 to the main control unit through the normally closed contacts 71. The output legs of the bridge 70 supply a D.C. pulse to a stepping relay 72. A two second time delay relay 73 is connected in parallel with the rectifier bridge 70 and controls the contacts 71 previously mentioned.

The sequence of operation of the circuit with the auxiliary unit connected and using the plurality of heating elements as illustrated in FIG. 1 is the same as previously described up to the point where the heating band connected to the power source reaches temperature and the meter relay closes contact 38 actuating relay 37. Referring to FIG. 2, when relay 37 actuates it opens its contacts 29 which de-energizes relay 28. This closes contacts 26 which sends 110 volts across leads 54a and 55a to the auxiliary unit. This signal is rectified by bridge 70 and the resulting D.C. signal pulses stepping relay 72 to move its contact 57 to the next heating element. Assuming that element 58 is in the line, the contact will move to connect element 59, extinguishing heat-on indicator light 63 and lighting indicator 62 which tells the operator that the next pad is being heated. When leads 54 and 55 receive a signal, the delay relay 73 actuates after two seconds to open contacts 71 which removes the high voltage from the stepping relay but only after it has had sufficient time to advance its contact. As current flows through coil 56 to the load, the coil will hold contacts 65 open and prevent any voltage from reaching the second auxiliary circuit containing the primary of transformer 64 and this second circuit remains inoperative under normal conditions.

If less than the selected number of heating elements (three in the case of the present illustration) are connected to the stepping relay contacts, the second circuit previously mentioned actuates to step the relay on to the next point. This permits the use of the system with less than the designed number of elements. For example, assume that heating element 58 is disconnected, since the operator needs to use only two pads for a particular job. When the relay 28 closes to begin the normal heating cycle, no current will flow in lines 14 and 15 of FIGS. 2 and 3. Thus, coil 35 will not be energized to close contacts 34 and no signal will reach the meter relay 39. Hence, relay 37 will not actuate to open its contacts 29 to drop relay 28 back out of the circuit. Since relay 28 remains actuated, contacts 26 are held open and no signal will arrive at the stepping relay 72 in FIG. 3. Therefore, the circuit would ordinarily lie dormant on the no-load connection. However, the second auxiliary circuit in FIG. 3 is designed to correct the situation. To illustrate, since no current flows to the load 58, which is assumed to be disconnected, coil 56 is not energized as it normally would be. Contacts 65 remain closed, rather than opening as they would under ordinary operation, and the primary of transformer 64 is energized by the power source. In addition, time delay relay 66 is energized. After five seconds it closes its normally open contacts 68 and 69. The secondary of transformer 64 then sends a signal which is rectified by bridge 67 and transmitted to the main control circuit through conductors 52 and 53. This signal energizes relay 37 and causes it to open contacts 29. This resets the main circuit and causes stepping relay 72 to be pulsed in the manner previously described in regard to normal operation. The relay 72 will step onto the next contact and, if a load is present, will run through a normal heating cycle. If no load is present, the circuit just described will pulse the relay onto the next contact after the elapse of five seconds. Since all indicator lights are operating as described, the operator will have a visual signal that a heating element is inoperative but the control will nonetheless continue to operate with less than the maximum selected elements in the line. As a result, the auxiliary unit may be designed to accommodate the largest size off-the-road tire expected to be encountered while nonetheless providing flexibility of operation in that smaller tires requiring a lesser number of heating elements may be repaired with the multiple pad system.

While certain representative embodiments and details have been shown for the purpose of illustrating the invention, it will be apparent to those skilled in this art that various changes and modifications may be made therein without departing from the spirit or scope of the invention.

I claim:

1. A control system for use in regulating the temperature of an electrical resistance heating element, the resistance of said element being responsive to temperature variation, said system comprising in combination a current source, switch means adapted to connect said current source to said heating element, means in parallel with said heating element and said source to derive from said source a potential proportional to the voltage of said source, means in series with said heating element to derive from said source a potential proportional to the current in said heating element and consequently the temperature thereof, means to present said potentials in polar opposition and to derive therefrom a signal representative of the difference between said potentials, conducting means operable by said potential difference signal to actuate said switch means to disconnect said current source from said heating element when the desired temperature is attained, means to cyclically control the actuation of said switching means to maintain the desired temperature in said heating element, means actuatable by the loss of the circuit through said heating element to prevent the presentation of a signal to said conducting means, and timing means controlling the total operational time of said system.

2. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying means to present said potentials in polar opposition and to derive therefrom a signal representative of the difference between said potentials, and conducting means operable by said potential difference signal to actuate said switching means to disconnect said current source from said heating element when the desired temperature is attained.

3. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying means to present said potentials in polar opposition and to derive therefrom a signal representative of the difference between said potentials, conducting means operable by said potential difference signal to actuate said switch means to disconnect said current source from said heating element when the desired temperature is attained, and means to cyclically control the actuation of said switch means to maintain the desired temperature in said heating element.

4. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying means to present said potentials in polar opposition and to derive therefrom a signal representative of the difference between said potentials, conducting means operable by said potential difference signal to actuate said switching means to disconnect said current source from said heating element when the desired temperature is attained, and means actuatable by the loss of the circuit through said heating element to prevent the presentation of a signal to said conducting means.

5. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying means to present said potentials in polar opposition and to derive therefrom a signal representative of the difference between said potentials, conducting means operable by said potential difference signal to actuate said switch means to disconnect said current source from said heating element when the desired temperature is attained, means to cyclically control the actuation of said switch means to maintain the desired temperature in said heating element, and means actuatable by the loss of the circuit through said heating element to prevent the presentation of a signal to said conducting means.

6. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying means to present said potentials in polar opposition and to derive therefrom a signal representative of the difference between said potentials, conducting means operable by said potential difference signal to actuate said switch means to disconnect said current source from said heating element when the desired temperature is attained, means to cyclically control the actuation of said switch means to maintain the desired temperature in said heating element, and timing means controlling the total operational time of said system.

7. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying means to present said potentials in polar opposition and to derive therefrom a signal representative of the difference between said potentials, conducting means operable by said potential difference signal to actuate said switch means to disconnect said current source from said heating element when the desired temperature is attained, means actuatable by the loss of the circuit through said heating element to prevent the presentation of a signal to said conducting means, and timing means controlling the total operational time of said system.

8. A control system for use in regulating the temperature of an electrical resistance heating element, the resistance of said element being responsive to temperature variations, said system comprising in combination a current source, switch means adapted to connect said current source to said heating element, voltage transformer means in parallel with said heating element and said source to derive therefrom a potential proportional to the voltage of said source, current transformer means in series with said heating element to derive from said source a potential proportional to the current in said element and consequently the temperature thereof, rectifying bridge means to present said potentials in polar opposition and to derive therefrom a signal representative of the difference between said potentials, meter relay means operable by said potential difference signal to actuate said switch means to disconnect said current source from said heating element when the desired temperature is attained, means to cyclically control the actuation of said switch means to maintain the desired temperature in said heating element, means actuatable by the loss of the circuit through said heating element to prevent the presentation of a signal to said meter relay means, and timing means controlling the total operational time of said system.

9. A system for use in regulating the temperature of a plurality of electrical resistance heating units, the resistance of said units being responsive to temperature variations, said system comprising in combination a current source, switch means adapted to sequentially connect said current source to said heating units to cause them to be heated thereby, conducting means responsive to the current in said units and consequently the temperature thereof to actuate said switch means to step to a succeeding heating unit connection when the desired temperature is atained in the connected heating unit, and means actuatable by the loss of the circuit through a heating unit to prevent the presentation of a signal to said conducting means.

10. A system as claimed in claim 9 including time delay means actuated by the loss of the circuit through a heating unit to signal said switching means to step to a succeeding heating unit connection.

11. A system for use in regulating the temperature of a plurality of electrical resistance heating units, the resistance of said units being responsive to temperature variations, said system comprising in combination a current source, switch means adapted to sequentially connect said current source to said heating units to cause them to be heated thereby, means in parallel with said heating elements and said source to derive from said source a potential proportional to the voltage of said source, means in series with the heating units to derive from said source a potential proportional to the current in said heating units and consequently the temperature thereof, means to present said potentials in polar opposition and to derive therefrom a signal representative of the difference between said potentials, and conducting means operable by said potential difference signal to actuate said switch means to step to a succeeding heating unit connection when the desired temperature is attained in the connected heating unit.

12. A system as claimed in claim 11 including means actuatable by the loss of the circuit to a heating unit to prevent the presentation of a signal to said conducting means.

13. A system as claimed in claim 11 including time delay means actuatable by the loss of the circuit to a heating unit to signal said switching means to step to a succeeding heating unit connection.

14. A system for use in regulating the temperature of a plurality of electrical resistance heating units, the resistance of said units being responsive to temperature variations, said system comprising in combination a current source, switch means adapted to sequentially connect said current source to said heating units to cause them to be heated thereby, means in parallel with said heating elements and said source to derive from said current source a potential proportional to the voltage of said source, means in series with said heating units to derive from said source a potential proportional to the current in said heating units and consequently the temperature thereof, means to present said potentials in polar opposition and to derive therefrom a signal representative of the difference between said potentials, conducting means operable by said potential difference signal to actuate said switch means to step to a succeeding heating unit connection when the desired temperature is attained in the connected heating unit, means actuatable by the loss of the circuit to a heating unit to prevent the presentation of a signal to said conducting means, and time delay means actuatable by the loss of the circuit to a heating unit to signal said switching means to step to a succeeding heating unit connection.

References Cited in the file of this patent
UNITED STATES PATENTS

| | | |
|---|---|---|
| 1,162,397 | Price | Nov. 30, 1915 |
| 1,183,814 | Haagn | May 16, 1916 |
| 2,157,910 | McCormick | May 9, 1939 |
| 2,549,095 | Huck | Apr. 17, 1951 |
| 2,709,216 | Moran et al. | May 24, 1955 |
| 2,769,076 | Bogdan | Oct. 30, 1956 |
| 2,784,289 | Huck | Mar. 5, 1957 |
| 2,843,714 | Stanton | July 15, 1958 |
| 2,938,100 | Gibbs | May 24, 1960 |
| 2,957,066 | Brandt | Oct. 18, 1960 |